(12) United States Patent
Doan et al.

(10) Patent No.: US 11,523,968 B2
(45) Date of Patent: Dec. 13, 2022

(54) METHODS FOR DETERMINING FLUIDIC FLOW CONFIGURATIONS IN A POOL SYSTEM

(71) Applicant: Poolside Tech, LLC, New Hope, PA (US)

(72) Inventors: William R. Doan, New Hope, PA (US); Stan Reznik, Riverwoods, IL (US)

(73) Assignee: Poolside Tech, LLC, New Hope, PA (US)

( * ) Notice: Subject to any disclaimer, the term of this patent is extended or adjusted under 35 U.S.C. 154(b) by 0 days.

(21) Appl. No.: 17/210,071

(22) Filed: Mar. 23, 2021

(65) Prior Publication Data

US 2022/0125677 A1   Apr. 28, 2022

Related U.S. Application Data

(60) Provisional application No. 63/106,165, filed on Oct. 27, 2020.

(51) Int. Cl.
  *G05D 11/13* (2006.01)
  *A61H 33/00* (2006.01)
  (Continued)

(52) U.S. Cl.
  CPC ......... *A61H 33/005* (2013.01); *E04H 4/1245* (2013.01); *E04H 4/14* (2013.01);
  (Continued)

(58) Field of Classification Search
  CPC .......... A61H 33/005; A61H 2201/5007; A61H 2033/0058; A61H 2201/02; G05D 11/132;
  (Continued)

(56) References Cited

U.S. PATENT DOCUMENTS 3,819,297 A   6/1974   East
4,090,532 A   5/1978   Story
(Continued)

FOREIGN PATENT DOCUMENTS

WO    WO2021050932 A1 *  3/2021  ............. F04B 49/00

OTHER PUBLICATIONS

International Search Report and Written Opinion, International Patent Application No. PCT/US2021/072008, dated Dec. 7, 2021.

*Primary Examiner* — Michael W Choi
(74) *Attorney, Agent, or Firm* — Saul Ewing Arnstein & Lehr LLP; Brian R. Landry

(57) ABSTRACT

One aspect of the invention provides a computer-implemented method for controlling a swimming pool or spa system. The computer-implemented method includes: creating a data structure representing a plurality of swimming pool system components and fluidic connections between subsets of the plurality of swimming pool system components; receiving a request to control one or more of the plurality of swimming pool system components; calculating fluidic flows through the plurality of swimming pool system components based on one or more potential configurations of the plurality of swimming pool system components capable of fulfilling the request; and detecting whether the one or more potential configurations result in unsatisfactory conditions.

20 Claims, 17 Drawing Sheets

(51) Int. Cl.
  *G05B 15/02*   (2006.01)
  *E04H 4/14*    (2006.01)
  *E04H 4/12*    (2006.01)
  *G05D 7/06*    (2006.01)
  *G05D 11/00*   (2006.01)
  *E04H 4/16*    (2006.01)

(52) U.S. Cl.
  CPC .......... *G05B 15/02* (2013.01); *G05D 11/132* (2013.01); *A61H 2033/0058* (2013.01); *A61H 2201/02* (2013.01); *A61H 2201/5007* (2013.01); *E04H 4/129* (2013.01); *E04H 4/1672* (2013.01); *G05D 7/0617* (2013.01); *G05D 11/003* (2013.01)

(58) Field of Classification Search
  CPC .. G05D 7/0617; G05D 11/003; E04H 4/1245; E04H 4/14; E04H 4/1672; E04H 4/129; G05B 15/02
  USPC ......................................................... 700/282
  See application file for complete search history.

(56)    References Cited

U.S. PATENT DOCUMENTS

| | | | |
|---|---|---|---|
| 4,322,297 A | 3/1982 | Bajka | |
| 5,483,227 A | 1/1996 | Kuo et al. | |
| 6,670,584 B1 | 12/2003 | Azizeh | |
| 7,931,447 B2 | 4/2011 | Levin et al. | |
| 8,131,497 B2 | 3/2012 | Steinberg et al. | |
| 8,313,305 B2 | 11/2012 | Bevington | |
| 8,800,473 B1 | 8/2014 | Deverse et al. | |
| 9,031,702 B2 | 5/2015 | Pruchniewski et al. | |
| 10,219,975 B2 | 3/2019 | Potucek et al. | |
| 10,571,937 B1 | 2/2020 | Hurst | |
| 2003/0163865 A1 | 9/2003 | Huang | |
| 2004/0230344 A1 | 11/2004 | Gallupe et al. | |
| 2005/0222786 A1* | 10/2005 | Tarpo | A61H 33/60 702/65 |
| 2006/0272830 A1 | 12/2006 | Fima | |
| 2007/0154319 A1 | 7/2007 | Stiles et al. | |
| 2008/0078100 A1 | 4/2008 | Kim et al. | |
| 2008/0086807 A1 | 4/2008 | Zeng | |
| 2008/0148592 A1 | 6/2008 | Kim et al. | |
| 2008/0313921 A1 | 12/2008 | Oh et al. | |
| 2008/0313923 A1 | 12/2008 | Oh et al. | |
| 2009/0139110 A1 | 6/2009 | Oh et al. | |
| 2009/0151801 A1 | 6/2009 | Gorman et al. | |
| 2009/0204263 A1 | 8/2009 | Love | |
| 2011/0315262 A1 | 12/2011 | Butler et al. | |
| 2012/0073040 A1 | 3/2012 | Cohen | |
| 2012/0123594 A1 | 5/2012 | Finch et al. | |
| 2013/0234057 A1 | 9/2013 | Muller | |
| 2013/0327403 A1 | 12/2013 | Jensen | |
| 2013/0331087 A1 | 12/2013 | Shoemaker et al. | |
| 2014/0305525 A1 | 10/2014 | Le Moing et al. | |
| 2015/0278930 A1* | 10/2015 | Potucek | G06Q 30/02 705/26.61 |
| 2016/0153456 A1 | 6/2016 | Stiles et al. | |
| 2017/0209338 A1 | 7/2017 | Potucek et al. | |
| 2018/0224822 A1 | 8/2018 | Potucek et al. | |
| 2018/0240322 A1 | 8/2018 | Potucek et al. | |
| 2019/0204203 A1 | 7/2019 | Nix | |
| 2019/0226601 A1 | 7/2019 | Feng et al. | |
| 2019/0331363 A1 | 10/2019 | Peng et al. | |
| 2020/0319621 A1* | 10/2020 | Roy | A61H 33/00 |
| 2021/0047853 A1 | 2/2021 | Gamboa et al. | |

* cited by examiner

METHODS FOR DETERMINING FLUIDIC FLOW CONFIGURATIONS IN A POOL SYSTEM

CROSS-REFERENCE TO RELATED APPLICATION

This application claims the benefit of priority under 35 U.S.C. § 119(e) to U.S. Provisional Patent Application Ser. No. 63/106,165, filed Oct. 27, 2020. The entire content of this application is hereby incorporated by reference herein.

BACKGROUND OF THE INVENTION

Pool systems (e.g., swimming pools, hot tubs, spas, and the like) typically include various types of maintenance components for heating, cooling, and/or cleaning the pool water, and water features for user enjoyment of the system, such as water fountains, waterfalls, pools, spas, and the like. The different components can be fluidically coupled to one another in a multitude of configurations. Further, conventional pool systems do not account for the variety of different fluid configurations, or the different energy, flow rate, or other operating conditions of the components during water flow activities.

SUMMARY OF THE INVENTION

One aspect of the invention provides a computer-implemented method for controlling a swimming pool or spa system. The computer-implemented method includes: creating a data structure representing a plurality of swimming pool system components and fluidic connections between subsets of the plurality of swimming pool system components; receiving a request to control one or more of the plurality of swimming pool system components; calculating fluidic flows through the plurality of swimming pool system components based on one or more potential configurations of the plurality of swimming pool system components capable of fulfilling the request; and detecting whether the one or more potential configurations result in unsatisfactory conditions.

This aspect of the invention can have a variety of embodiments. The computer-implemented method can further include: detecting one or more potential configurations that result in a satisfactory fluidic flow; and selecting one of the one or more satisfactory configurations for fluidic flow to the one or more of the plurality of swimming pool system components. The selecting step can identify the most optimal of the one or more satisfactory configurations for fluidic flow to the one or more of the plurality of swimming pool system components based on one or more criteria. The one or more criteria can include one or more selected from the group consisting of: cost, noise, speed, and carbon footprint. The computer-implemented method can further include controlling one or more of the swimming pool system components or fluidic connections to implement the selected satisfactory configuration.

The unsatisfactory conditions can include one or more selected from the group consisting of: underflow, overflow, no-flow, misdirection, and unsafe. One or more of the unsatisfactory conditions can be defined on a component-specific basis.

The computer-implemented method can further include restricting a user's ability to select the one or more potential configurations resulting in unsatisfactory conditions. The restricting step can include disabling one or more graphical user interface widgets associated with the one or more potential configurations. The restricting step can include presenting an alternative to a user request that would bring about the one or more potential configurations resulting in unsatisfactory conditions.

The data structure can be created using a graphical user interface in which a user can define links between the plurality of swimming pool system components.

The one or more of the plurality of swimming pool components can include an actuator-based pool cleaner. The one or more of the plurality of swimming pool components can include a booster-pump-based pool cleaner.

The one or more potential configurations can include fluid flow through a spa basin.

The plurality of swimming pool components can further include a plurality of fluid flow pumps. The one or more conditions can be selected from the group consisting of: underflow, overflow, and safety conditions of the plurality of fluid flow pumps.

The one or more conditions can be selected from the group consisting of: underflow, overflow, and flow rate restrictions of the fluidic connections. The computer-implemented method can further include adjusting power output of at least one of the plurality of swimming pool system components based on the flow rate restrictions.

The plurality of swimming pool system components can include at least a pool basin and a spa basin. The one or more conditions can be selected from the group consisting of: underflow, overflow, and fluid spillover restrictions.

The plurality of swimming pool system components can include at least one or more fluid valves. The plurality of swimming pool system components can include at least one or more pool heaters, pool coolers, or a combination thereof. The plurality of swimming pool system components can include at least one or more water features.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DEFINITIONS

Figure 1:
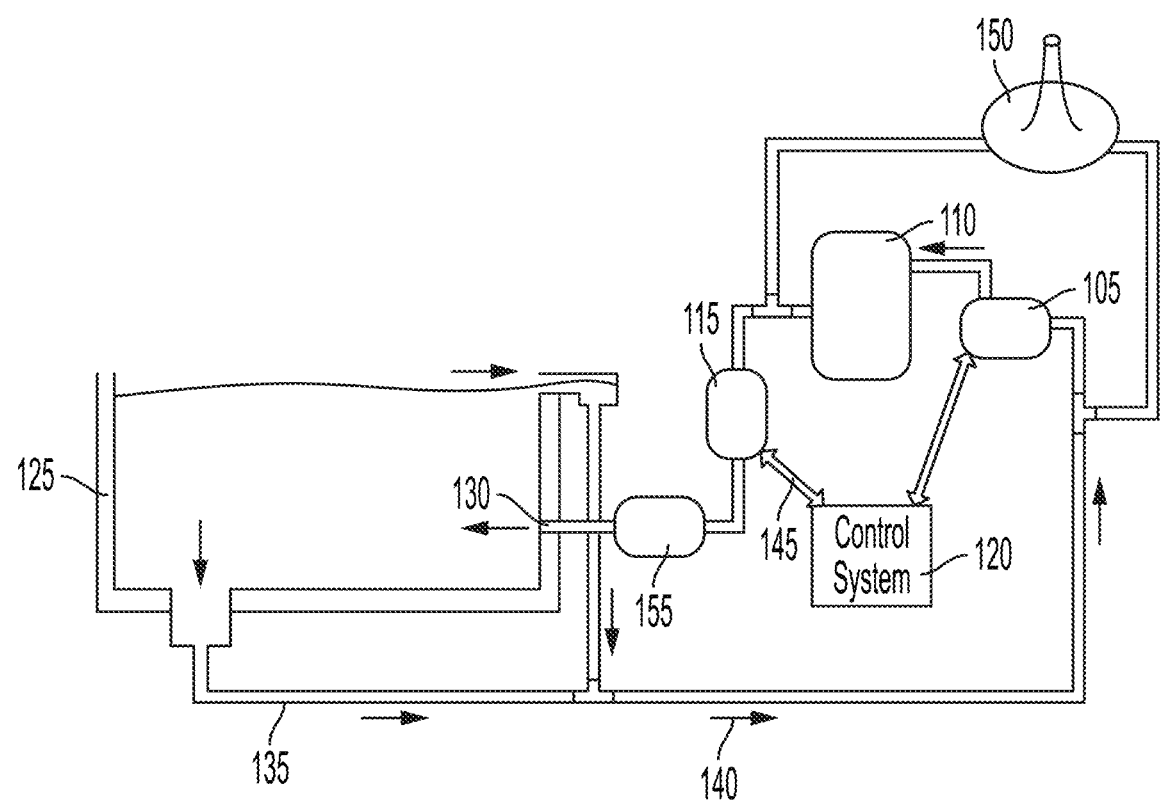
FIG. 1 depicts a pool system according to embodiments of the claimed invention.

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Pool System

Methods and systems described herein relate to determining fluid flow configurations in a pool system. Configuring pool and spa systems is conventionally a tedious task that is prone to user error. Conventional pool and spa control systems do not permit pool service professionals the ability to define plumbing layout, and instead rely on hard-coded layouts or tedious pool installation tasks such as manual programming (e.g., of IF/THEN conditions driving pool equipment operations). Ultimately, it is left up to a user to determine potential fluid-flow conflicts prior to activating water features or maintenance features of the pool. However, should a user make a mistake in activating or programming components of the pool system that cause a fluid-flow conflict, or unknowingly activate components that cause a conflict, components of the pool system can be damaged and/or water and energy can be wasted.

The techniques and systems described herein relate to the determination of optimal flowpath configurations for a pool system, which can mitigate the possibility of fluid-flow conflicts. Fluid-flow conflicts can arise when pool components that conflict with one another are activated, such as when a spa is activated (e.g., water is pumped from the spa) and certain other water features are simultaneously activated resulting in some of the water returning to the pool. In this example, the smaller body of water (spa) will eventually be drained, causing equipment damage and pool owner dissatisfaction. A fluid-flow conflict can also arise when a pool component is activated, but the plumbing configuration is inadequate or incompatible with the activated pool component, such as a pump generating too much flow for desired operation of a water feature (e.g., a fountain).

According to the methods and systems described herein, a control system can identify pool components that are part of the pool system. The control system can also determine electronic and fluidic connections between the pool components, such that the control system can calculate flowpath pathways or configurations for the components. Further, the control system can determine various operating parameters of the pool components, such as power output, fluid flow capacity, and the like.

The control system can then determine flow path configurations that include a pool system component. The system can identify various flowpath configurations for a desired component that do not cause flow conflicts within the pool system, for example, by considering operating parameters of other pool components potentially activated within the configuration.

The pool system can further filter the flowpath configurations based on other desired thresholds. For example, the pool system can select a flowpath configuration that does not cause a flow conflict and produces maximum energy savings. In some cases, once a flowpath configuration is selected by the pool system, the pool system can notify a user of the selected flowpath. Additionally, the pool control system can adjust the fluid flowpath dynamically based on real-time user inputs or control system predicted needs of the pool system (e.g., turning on additional fountains or filter the water, and the like).

Fluid-Flow Pump

FIG. 1 depicts a pool system in accordance with an embodiment of the claimed invention. The pool system can include a fluid flow pump 105. The pump, when activated, can flow water or other fluid through the pool system. In some cases, the fluid-flow pump 105 can be a single-stage pump that operates at a static power output and/or rotational speed (e.g., in rpm). In other cases, the fluid flow pump can be a variable-speed pump. In these cases, the pump can be activated at variable flow rates. For example, a controller or control system can manage the rotations per minute (rpm) of a pump motor, which can be directly correlated to the power output of the pump. Additionally, as the pump can include a maximum rpm or power output, a controller or control system can activate the pump at rpm and/or power fractions of the pump's maximum output. Examples of variable speed pumps can include, but are not limited to, HAYWARD ECOSTAR, HAYWARD TRISTAR, JANDY EPUMP, PENTAIR INTELLIFLO VS, and the like.

Flow-Rate Sensor

The pool system can also include a flow-rate sensor 115. The flow rate sensor 115 can be in fluidic communication with the fluid flow pump 105, for example via a fluid channel such as piping. The flow rate sensor 115 can receive flow rate measurement signals of a fluid flowing to the flow rate sensor 115. In some cases, the flow-rate sensor 115 can be "downstream" of the fluid flow pump 105, such that fluid flowing from the pump 105 flows towards the flow rate sensor 115.

In some cases, the flow rate sensor 115 can include "smart" sensors, such as a flow-rate turbine or a piezo-electric flow meter. In the case of a flow-rate turbine, the turbine can be pushed by fluid flowing through the fluid channel or pipe. The pushed turbine can generate an electric current or signal based on the speed of the fluid flow, where a processor can then identify the flow rate from the amount of electricity generated. In the case of piezo-electric flow meters, flow rate can be determined through measuring the Doppler effect and/or propagation time of ultrasonic waves generated by the flow meter. In any of these smart flow rate sensor cases, the flow rate sensor may be coupled to an intermediary processor, which can process received measurements and signals to generate flow rate values and the like. This intermediary processor can communicate electronically to the controller or control system of the pool system.

In some cases, the flow rate sensor 115 can include a minimal flow-rate registration threshold. For example, the flow rate sensor 115 can include a flow switch. The flow switch can include a paddle positioned within the fluid channel. When the flow rate sensor experiences a sufficient flow rate of the flowing fluid, the paddle is "pushed" or deflected by the flowing fluid. An electronic circuit can be completed (e.g., closed) when the paddle is in the pushed or deflected position, and can be open otherwise. The closed circuit can transmit an electrical communication or signal to a controller or control system, such that the controller or control system can determine when a fluid flow rate exceeds the flow rate sensor's minimal flow rate registration threshold. Likewise, the controller or control system can determine when the fluid flow rate falls below the minimal flow rate registration threshold, as the controller or control system can determine that the system has not received an electrical communication from the flow rate sensor. Examples of flow rate sensors can include, but are not limited to, HAYWARD GLX-FLO-RP, HAYWARD AQUARITE, PENTAIR ITELLICHLOR, JANDY AQUAPURE, and the like.

Fluid Filter

The pool system can also include a fluid filter 110. The fluid filter 110 can filter particles, debris, and the like, from a fluid flowing through the pool system. Examples of fluid filters of the pool system can include, but are not limited to, HAYWARD PRO SERIES, HAYWARD SWIMCLEAR, JANDY PRO SERIES CV, JANDY CL CARTRIDGE FILTER, PENTAIR CLEAN and CLEAR PLUS, PENTAIR EASY CLEAN, and the like.

Control System

Figure 6:
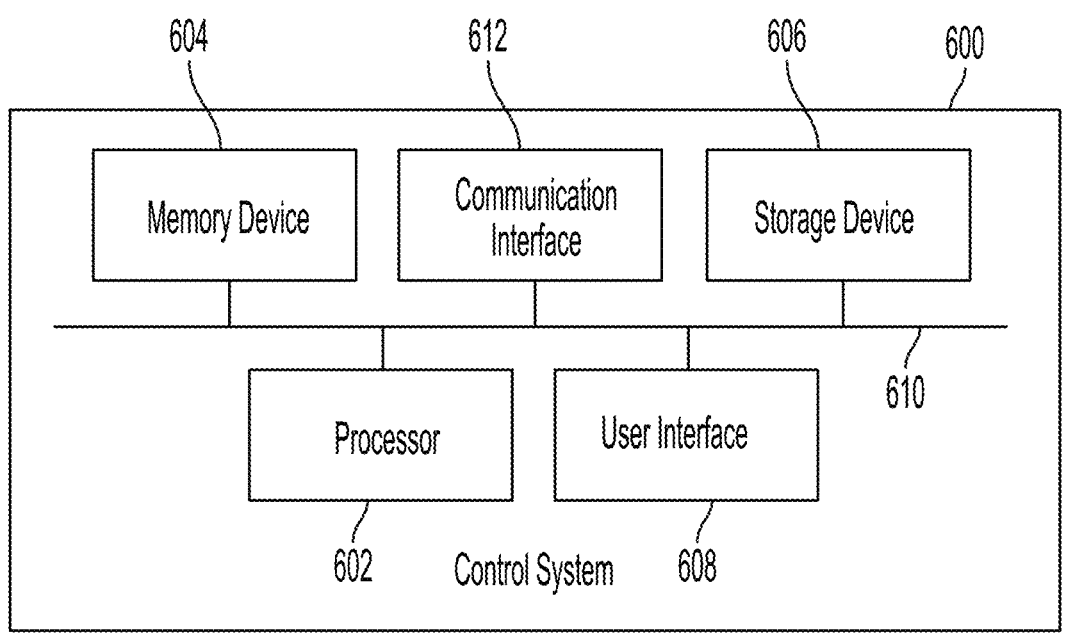
FIG. 6 depicts a control system according to embodiments of the claimed invention.

The pool system can also include a control system 120. For example, a control system 600 is depicted in FIG. 6. The control system can be in electronic communication with the variable speed pump and the flow rate sensor. In some cases, the control system can transmit activation communications to the variable speed pump, such as a percentage of maximum power output or rpms for the pump to operate under. Further, the control system can, in some cases, receive notification communications from the pump, the flow rate sensor, or both. For example, the pump can transmit communications notifying the control system of the pump activating at a given power output or rpm. The flow rate sensor can transmit flow rate communications to the control system, such as when the flow rate sensor is in a deflected or pushed position.

The control system 120 can be an electronic device programmed to control the operation of the pool system to achieve a desired result. The control system 120 can be programmed to autonomously carry out a system performance status regimen without the need for input (either from feedback devices or users) or can incorporate such inputs. The principles of how to use feedback (e.g., from a flow rate sensor) in order to modulate operation of a component are described, for example, in Karl Johan Astrom & Richard M. Murray, *Feedback Systems: An Introduction for Scientists & Engineers* (2008).

The control system 120 can be a computing device such as a microcontroller (e.g., available under the ARDUINO® OR IOIO™ trademarks), general purpose computer (e.g., a personal computer or PC), workstation, mainframe computer system, and so forth. As depicted in FIG. 6, the control system ("control unit") 600 can include a processor device (e.g., a central processing unit or "CPU") 602, a memory device 604, a storage device 606, a user interface 608, a system bus 610, and a communication interface 612.

The processor 602 can be any type of processing device for carrying out instructions, processing data, and so forth.

The memory device 604 can be any type of memory device including any one or more of random access memory ("RAM"), read-only memory ("ROM"), Flash memory, Electrically Erasable Programmable Read Only Memory ("EEPROM"), and so forth.

The storage device 606 can be any data storage device for reading/writing from/to any removable and/or integrated optical, magnetic, and/or optical-magneto storage medium, and the like (e.g., a hard disk, a compact disc-read-only memory (CD-ROM), CD-ReWritable (CDRW), Digital Versatile Disc-ROM (DVD-ROM), DVD-RW, and so forth). The storage device 606 can also include a controller/interface for connecting to the system bus 610. Thus, the memory device 604 and the storage device 606 are suitable for storing data as well as instructions for programmed processes for execution on the processor 602.

The user interface 608 can include a touch screen, control panel, keyboard, keypad, display or any other type of interface, which can be connected to the system bus 610 through a corresponding input/output device interface/adapter.

The communication interface 612 can be adapted and configured to communicate with any type of external device, or with other components of the pool system. For example, double-lined arrows, such as the arrow 145, can illustrate electronic communication between the control system 120 of FIG. 1 and another component of the pool system (e.g., the variable speed pump 105). The communication interface 612 can further be adapted and configured to communicate with any system or network, such as one or more computing devices on a local area network (LAN), wide area network (WAN), the Internet, and so forth. The communication interface 212 can be connected directly to the system bus 610 or can be connected through a suitable interface.

The control system 600 can, thus, provide for executing processes, by itself and/or in cooperation with one or more additional devices, that can include algorithms for controlling components of the pool system in accordance with the claimed invention. The control system 600 can be programmed or instructed to perform these processes according to any communication protocol and/or programming language on any platform. Thus, the processes can be embodied in data as well as instructions stored in the memory device 604 and/or storage device 606, or received at the user interface 608 and/or communication interface 612 for execution on the processor 602.

Fluid Heater/Cooler

The pool system in FIG. 1 can also include fluid heater/coolers 155. The heater/cooler 155 can be fluidically coupled to the flow pump 105 and can be configured to be fluidically coupled to the fluid repository 125. Further, the heater/cooler 155 can be in electronic communication with the control system 120. When activated, the heater/cooler 155 can alter the temperature of the fluid flowing through the heater/cooler 155.

The heater/cooler 155 can rely on a variety of energy sources. For example, the heater/cooler can be an electric heater or cooler, where the heat source is electrical. In some examples, the heater/cooler can be a natural gas heater, where the heat source is gas. In yet other examples, the heater/cooler can be a solar heater, where the heat source is solar. Further, the pool system can include a variety of heaters and/or coolers, where each heater and cooler is fluidically coupled to the fluid flow pump and configured to be coupled to a fluid repository.

Water Feature(s)

The pool system can also include a water feature 150. In some cases, the water feature 150 can include an aesthetic item, such as a water fountain or the like. Additionally or alternatively, the water feature 150 can include an item with a maintenance function, such as a pool cleaner and the like. The water feature can be in fluidic communication with the fluid flow pump 105, in electronic communication with the control system 120, or both. In some cases, fluid flow to and from the water feature can be controlled by the control system 120 either directly (e.g., activating the fluid feature), or indirectly (e.g., activating the fluid flow pump and directing fluid flow to the fluid feature via valves, etc.).

Pool Basin

The pool system can be coupled to a liquid repository 125, such as a pool basin, a spa basin, a hot tub basin, and the like. The coupling can be via fluidic channels, such as water piping and the like. Further, the dimensions and geometrical shapes of a coupled basin can vary, and one skilled in the art would understand different basin configurations can be coupled to the pool system.

In some cases, the pool system can be configured to couple to the fluid repository via an intake and outtake channels (e.g., channels 130 and 135). For example, fluid channels can couple the fluid repository to the fluid filter, and fluid channels can couple the fluid repository to the flow rate sensor and/or the variable speed pump. Yet in some cases, the pool system can be fluidically coupled to the fluid repository in a recycling configuration, such that fluid is recycled from the fluid repository, through the pool system, and back to the fluid repository.

Various Pool System Configurations

FIG. 1 depicts a particular pool system configuration, where the various pool components are fluidically connected (e.g., via plumbing) and electronically connected to other components in a particular fashion. However, one skilled in the art would understand that the methods and systems described herein can be implemented by pool systems containing a variety of fluidic and electronic connections. FIGS. 2-5 illustrate pool systems with different fluidic and/or electronic configurations, and the following description discusses flow conflicts that can arise within each particular configuration.

CONFIGURATION EXAMPLE 1

Figure 2:
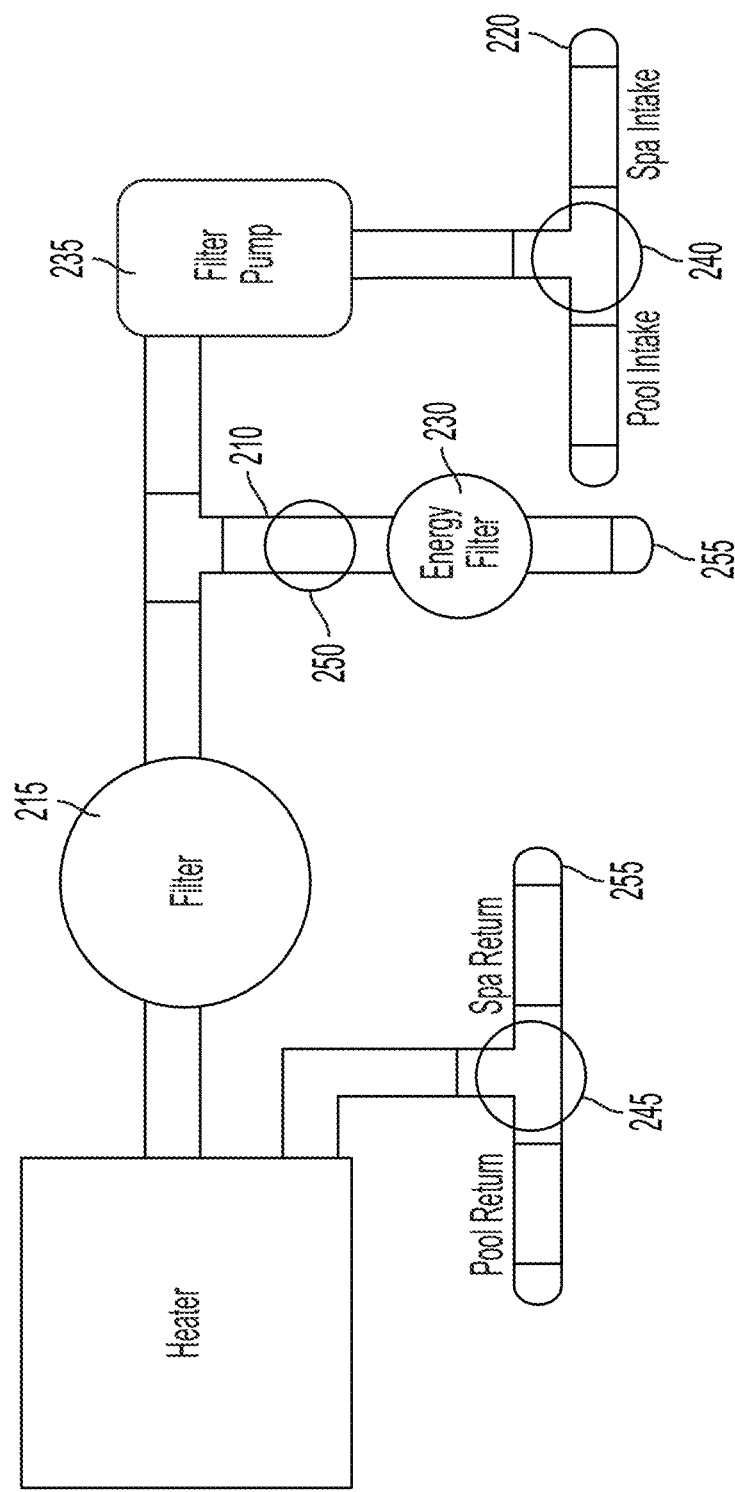
FIGS. 2-5 depict component configurations of a pool system according to embodiments of the claimed invention.

FIG. 2 depicts a pool system configuration according to an embodiment of the invention described herein. As shown, the pool cleaner line 210 is plumbed before the pool filter 215. In a scenario where both the pool cleaner and the spa are activated concurrently, both valves 240 and 245 can be configured to flow water from the spa intake 220 and to the spa return 225. However the valve 250 can also be open, leading water flow through the energy filter 230 and into the pool return 255. Thus, water can flow from the spa (e.g., via spa intake 220) and return to both the spa (e.g., via spa return 225) and the pool (e.g., through the energy filter 230). Eventually, the water level of the spa will reduce to a point where the spa is drained, since water intake is via the spa but water returns to the both the spa and the pool. In this scenario, the filter pump 235 will eventually run without fluid. The filter pump 235 can be damaged because no fluid is flowing through the plumbing intakes.

CONFIGURATION EXAMPLE 2

Figure 3:
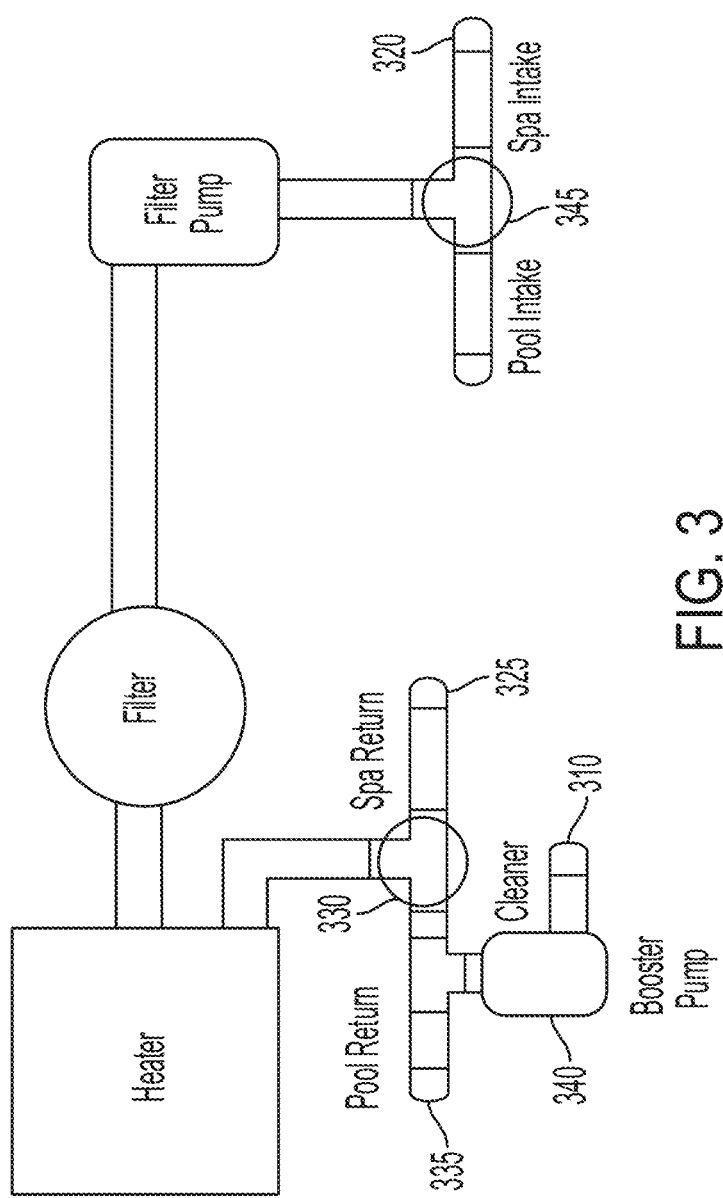

FIG. 3 depicts a pool system configuration according to an embodiment of the invention described herein. As shown, a booster pump 340 can activate for running a pool cleaner 310. In a similar scenario to Configuration Example 1, a scenario can arise where both the pool cleaner and the spa are activated concurrently. As the spa is activated, the valve 345 can be configured to flow water from the spa intake 320, and the valve 330 can be configured to flow to the spa return 325. However, as the cleaner 310 is also activated, the booster pump 340 can be activated as well. In this scenario, water can flow from the spa (e.g., via spa intake 320) and return to the spa (e.g., via spa return 325). As the valve 330 is configured for fluid flow for the spa (e.g., due to activation of the spa), the valve 330 can also concurrently be closed to fluid flow to the pool return 335 and the booster pump 310. Thus, the booster pump 310 in this scenario can operate without any suction fluid. This lack of suction fluid can damage the booster pump 310, which generally relies on the pumped fluid for cooling.

Fluid Flow Configuration Determination

The control system can determine flow-path configurations for a component included in the pool system. For example, pool components can include fluidic coupling (e.g., piping) between itself and other components of the pool system. The control system can identify the location of a pool component with respect to other components in the system. For example, the control system can identify that the flow sensor 115 of FIG. 1 is immediately downstream of the water filter 110, and the water filter 110 is immediately downstream of the fluid flow pump 105. In some cases, location identification of pool components can be provided by a user (e.g., manual input through a GUI of the pool system as depicted in FIGS. 9A-9H). Such input can be made by the pool installer after installation using the visual flow designer.

Additionally or alternatively, the control system can identify the pool component through electronic communication with the pool component. For example, the water heater 115 can be electronically coupled to the control system 120 through a specified port of the control system 120. The control system 120 can communicate with the pool heater via the electronic coupling, and identify that the pool heater 115 communication link is located at this specified port.

The control system can identify a variety of flowpath configurations possible through the pool system. The control system can identify fluidic couplings of an activated pool component (e.g., upstream and downstream components)

that form a "completed" flowpath. For example, the control system can identify a flowpath that includes an intake channel, and outtake channel, and the activated pool component. The control system can further identify any intermediary pool components required for fluid flow through the identified intake channel, outtake channel, and the activated component. As there may be a variety of intermediary pool components required for fluid flow through the identified intake channel, outtake channel, and the activated component, as well as different intake and outtake channels, the control system can identify a variety of flowpath configurations that result in fluid flow to the activated pool component.

Figure 7:
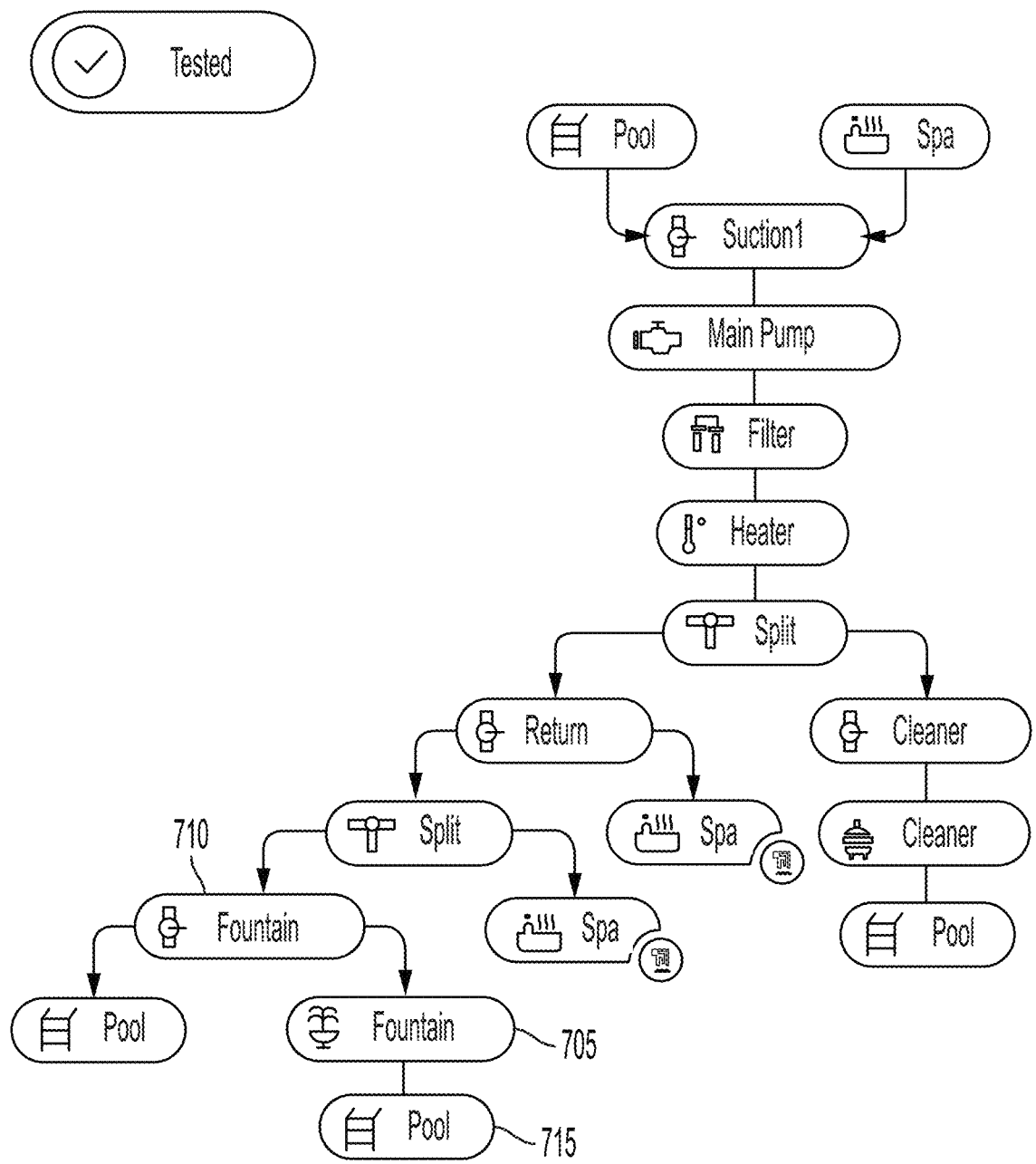
FIG. 7 depicts an electronic display of a fluidic coupling configuration of a pool system according to an embodiment of the claimed invention.

For example, the control system can identify all possible permutations of system components, which (if binary choices are assumed) will be on the order of 128 for a single-speed pump and 12,800 for a variable speed pump for the system in FIG. 7.

The control system can then identify different operating parameters and fluid flow statistics to determine whether an identified flowpath configuration results in a fluid flow conflict. For example, the control system can determine fluid flow metrics for fluid flowing through the flowpath configuration and for each component in the configuration. Fluid flow metrics can include flow rate, volume, and the like. The control system can then determine whether each pool component is receiving adequate fluid flow for normal operation (e.g., whether the pool component receives satisfactory flow, underflow, overflow, etc.). Further, the fluid flow requirements of a pool component can be determined through make and model information, user input, and the like. If a pool component fails to receive satisfactory fluid flow, the control system can filter out the identified flowpath configuration or identify it as unsatisfactory.

Figure 10:
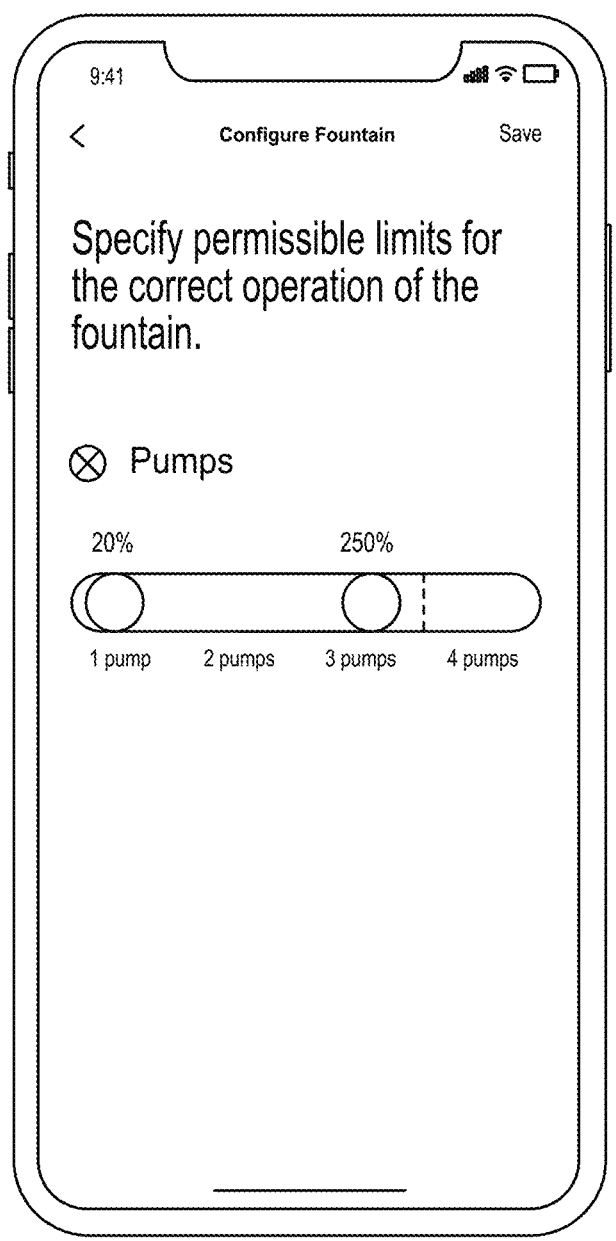
FIG. 10 provides a screenshot of a graphical user interface from a smartphone app used to specify an acceptable flow-rate range for a fountain according to an embodiment of the claimed invention.

Parameters for a particular component can be also be configured in the field (e.g., by the installer and/or the user). For example and referring to FIG. 10, a permissible flow rate range can be set for a fountain to provide sufficient flow for a desired visual effect while ensuring that the fountain does not launch water beyond the swimming pool. The permissible flow rate range can be relevant, e.g., when a user requests operating the fountain at the same time as other components requiring a certain flow rate. For example, if the installer determined that fountain operation with pump power level at about 75% will launch water out of the pool and filtration is typically performed at an 80% pumping level, the system can reduce the pumping level if the fountain is actuated during filtration.

FIG. 7 depicts a display of a fluidic coupling configuration for pool components of a pool according to an embodiment of the claimed invention. The control system can provide this display to a user (e.g., via a GUI) to illustrate how each individual pool component is fluidically coupled to the other pool components of the pool system. For example, the fountain 705 can be immediately downstream of valve 710, and can be immediately upstream of pool 715. In some cases, the user can input the pool components into the correct fluidic coupling location (e.g., through dragging and dropping the fountain icon to the correct location, and the like). The control system can rely on this coupling configuration when determining flowpath configurations, as well as filtering unsatisfactory flowpath configurations due to operating conditions of the pool components.

Selection of Flowpath Configuration

The control system 120 can then select a flowpath configuration for the activated pool component. In some cases, the control system can further filter flowpath configurations for an activated pool component according to other pool parameters. For example, a user may desire the flowpath configuration meets other requirements, such as low noise generation, low cost, low carbon footprint, and the like. The control system can select this additional filter(s) (e.g., based on user input) for determining and selecting a flowpath configuration. Additionally or alternatively, the control system may monitor the total flow rate flowing to an activated component, such as a water fountain, for water filtration cycle requirements. For example, if an activated water fountain is downstream of a fluid filter, water flowing to the fountain is also flowing through the filter, and can be counted towards a water filtration volume required to satisfy a water filtration cycle as discussed in greater detail in U.S. Provisional Patent Application Ser. No. 63/019,004, filed May 1, 2020. The control system can monitor these pool parameters and store parameter values (e.g., in memory), or can periodically monitor the parameters. The control system can, based on these pool parameters, calculate total metrics for an identified flowpath configuration from each individual pool component in the respective configuration. For example, the control system can determine a noise level generated for each individual pool component in the flowpath configuration, and sum the generated noise levels to determine the total noise level generated by the flowpath configuration.

The control system can further filter flowpath configurations based on a selected pool parameter threshold. For example, the control system can filter flowpath configurations that exceed value threshold corresponding to energy use, carbon footprint, utility costs, and the like. In some cases, the control system can select a flowpath configuration that minimizes a pool parameter (e.g., cost, carbon footprint, noise, etc.). As used herein, "cost" can include both monetary costs as well as non-monetary costs (which may include monetary components).

The unsatisfactory flow paths can be utilized in a variety of manners. In some embodiments, the unsatisfactory flow paths will be excluded from any options presented to the user. In other embodiments, the unsatisfactory flow paths will be depicted, but shown in grey or a lighter shade and with selections disabled. In still another embodiment, the unsatisfactory paths can be utilized to detect a problem with a user request to activate multiple components at the same time. In such an embodiment, the system can identify other options (e.g., suspending operation of one or more components and present those options to the user via a GUI).

Pool Parameters

Figure 8:
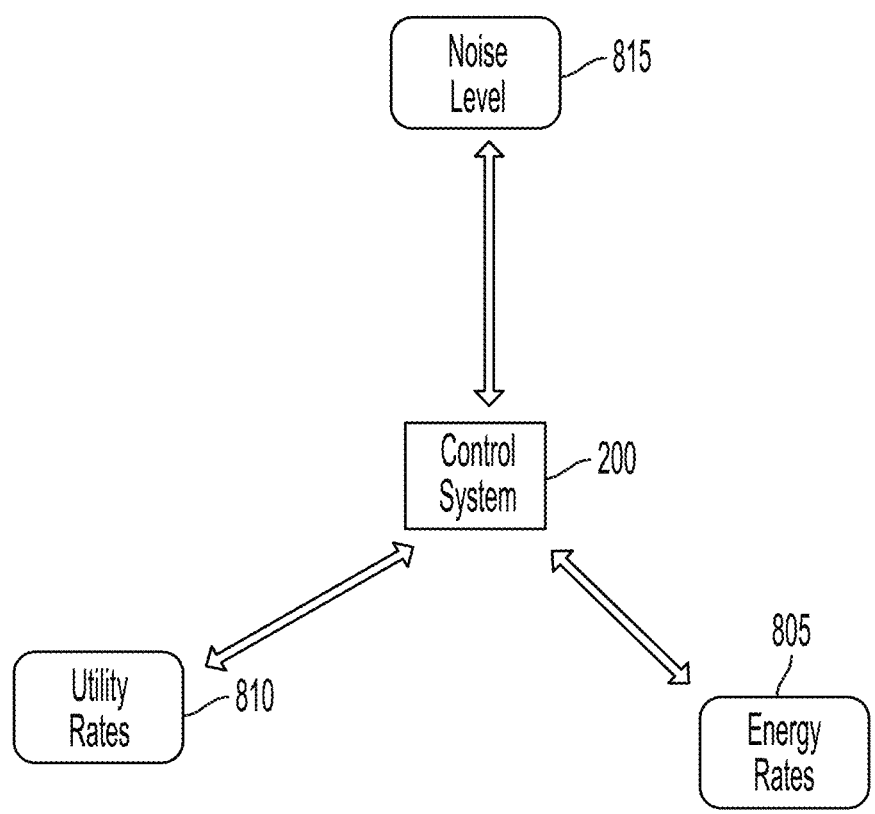
FIG. 8 depicts pool parameters monitored by a control system according to an embodiment of the claimed invention.
Figure 9A:
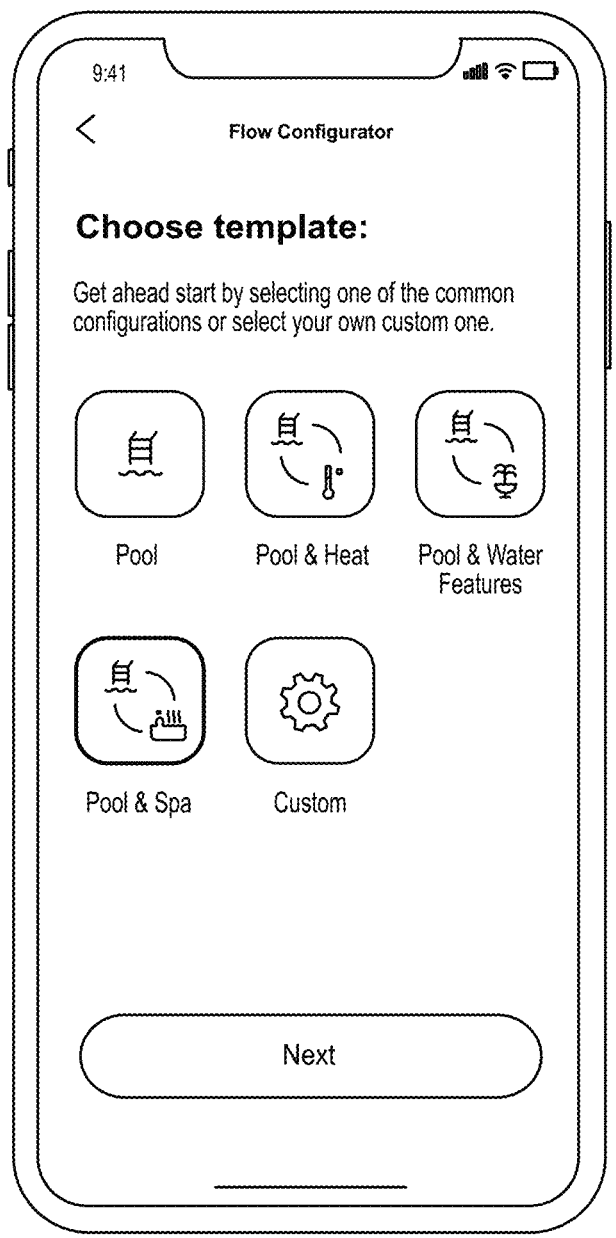
FIGS. 9A-9H provide screenshots of a graphical user interface from a smartphone app used to specify the configuration of a pool system according to an embodiment of the claimed invention.
Figure 9B:
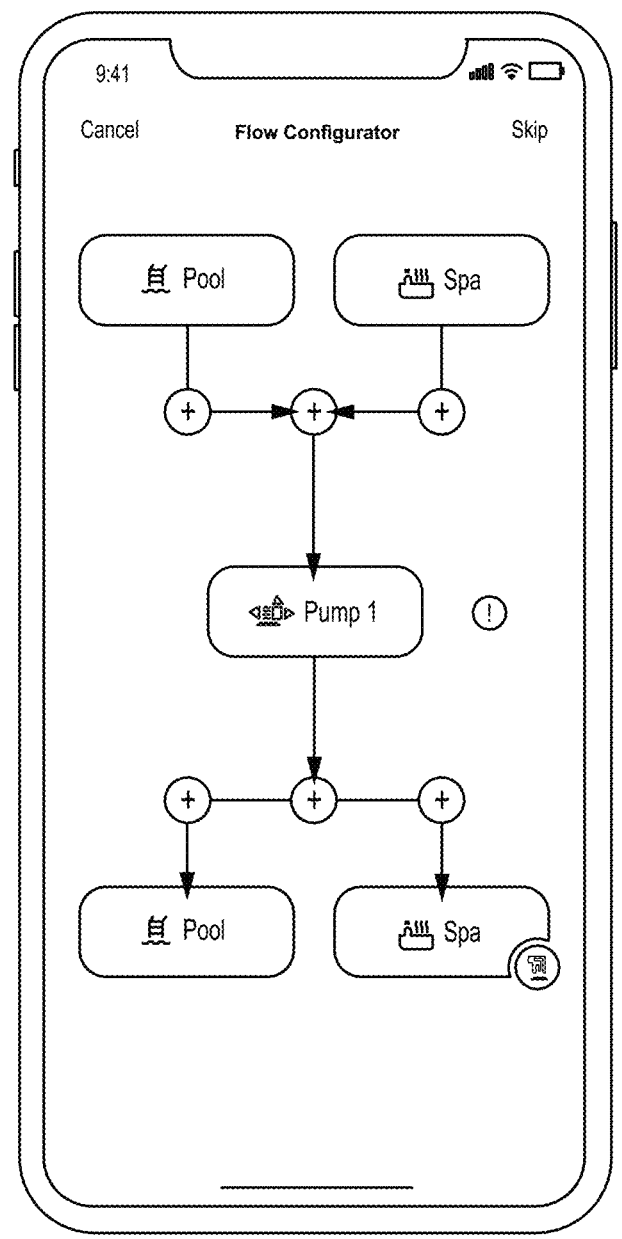
Figure 9C:
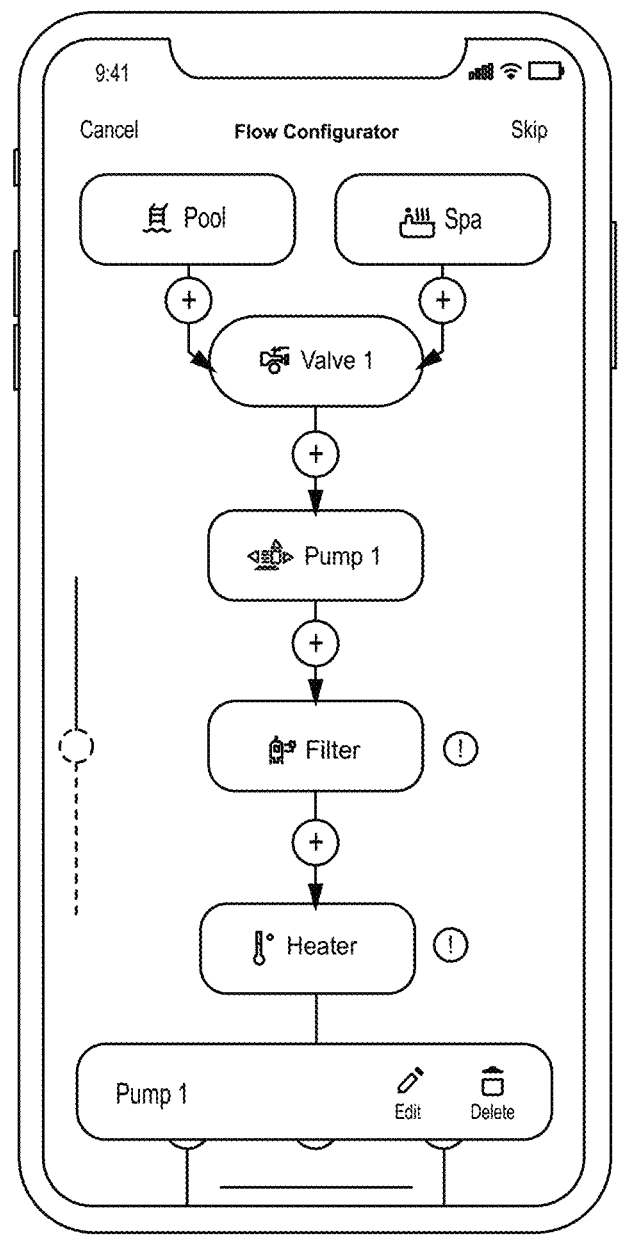
Figure 9D:
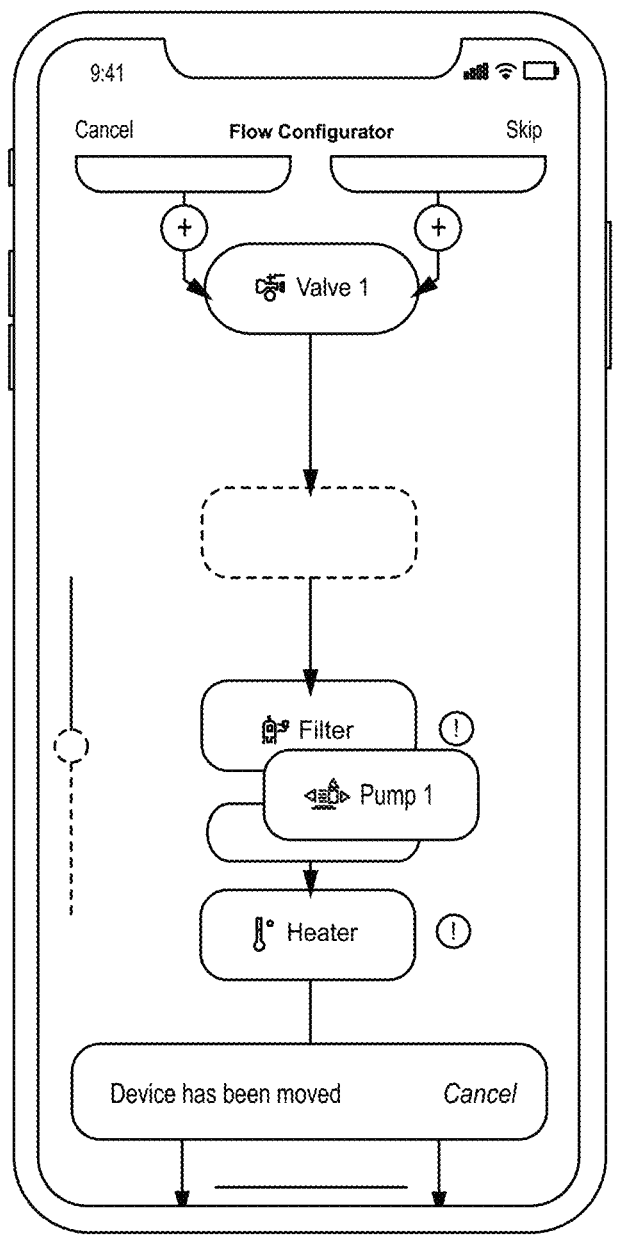
Figure 9E:
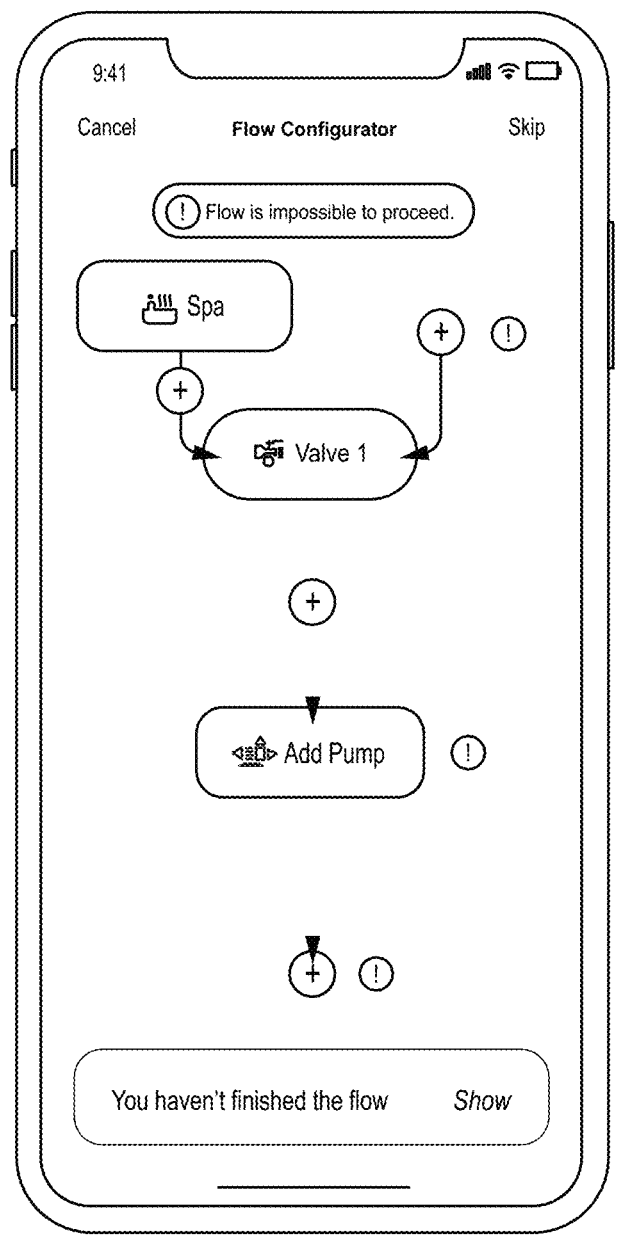
Figure 9F:
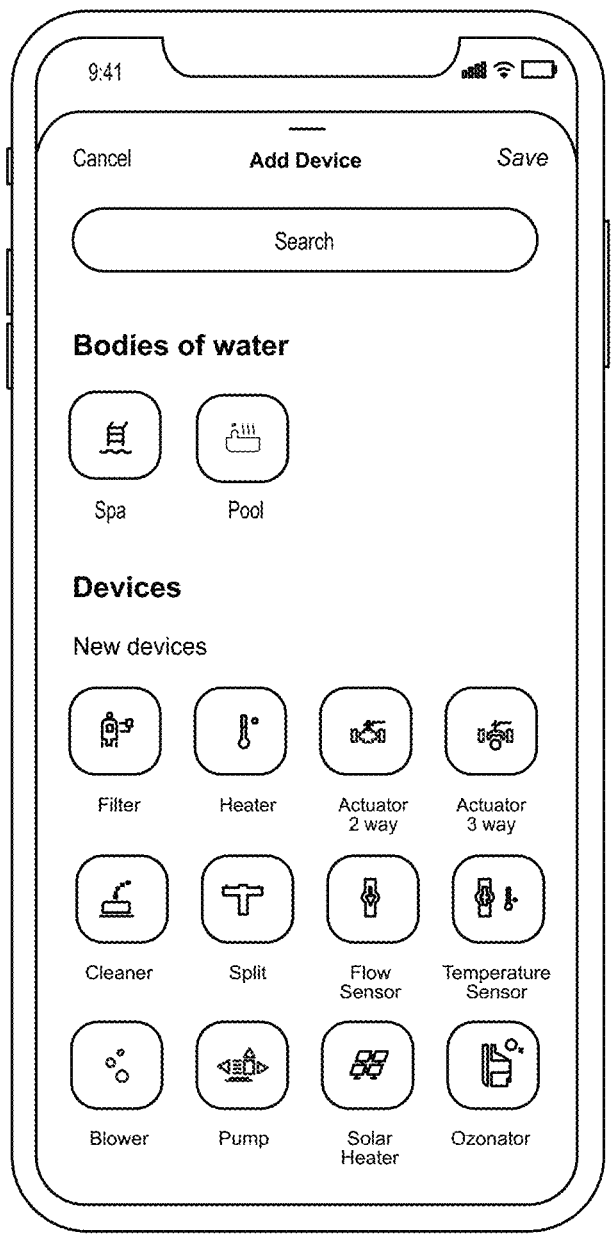
Figure 9G:
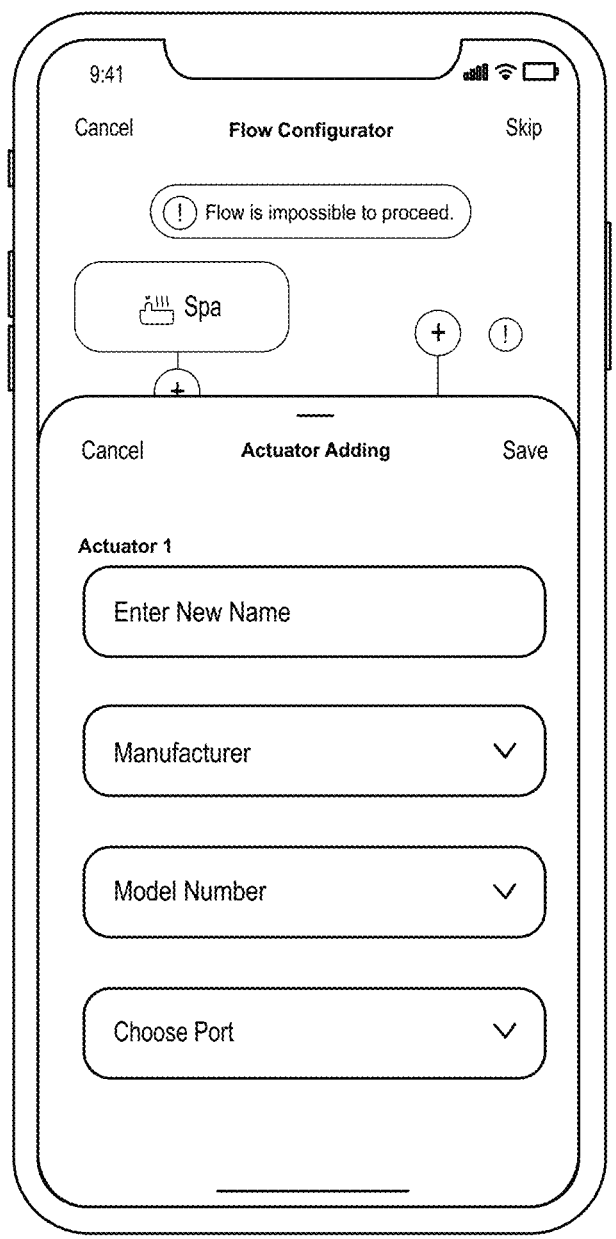
Figure 9H:
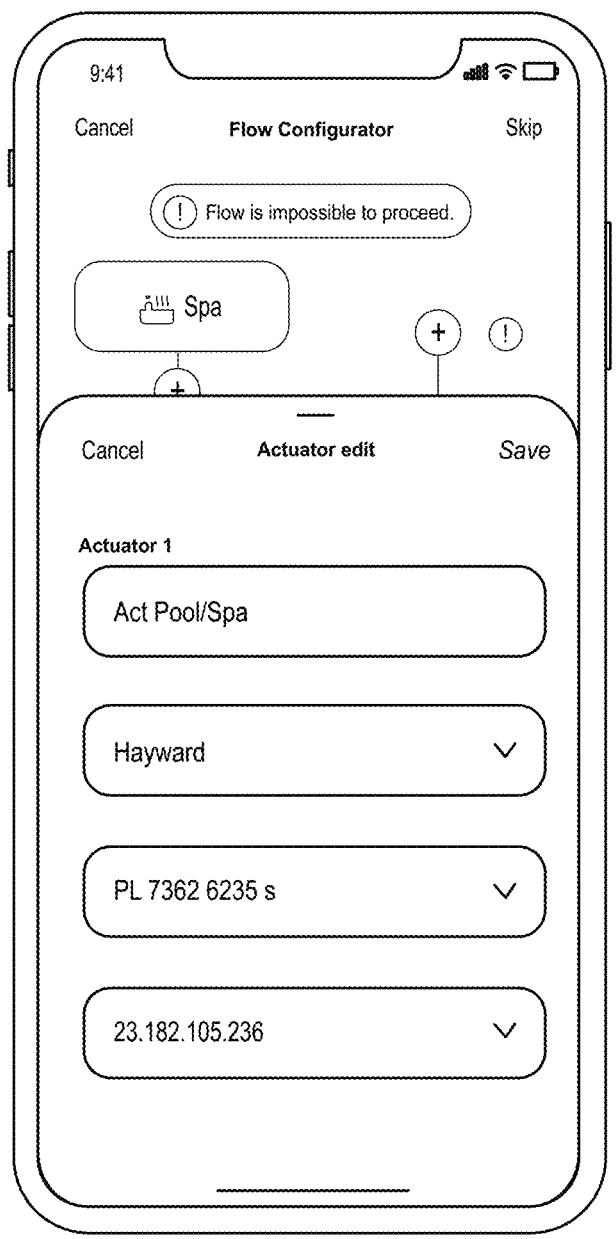

The control system can monitor various parameters that affect energy expenditure, associated costs, and generated noise during operation of a pool component. Further, FIG. 8 depicts the various parameters that the control system can monitor. These various parameters are discussed in more detail below.

Utility Rates

The control system can identify utility rates for the components of the system (e.g., utility rates 810). For example, the control system can electronically communicate with a utility rate notification website or service. The control system can receive utility rates for the geographical location which the pool system is located. The utility rates can be categorized by type of energy (electric, natural gas, and the like), the date, and/or the time of day. In some cases, the control system can store these utility rates for future use.

Energy Expenditure Rates

The control system can identify energy expenditure rates for a given pool component (e.g., energy rates 805). For example, the control system can identify power usage of a pool component and store this value in memory. In some cases, the control system can identify the power usage of the pool component through the make and model of pool component (e.g., received via user input or electronic communication with the pool component).

Noise Generation

The control system can identify noise levels generated by the pool component when activated (e.g., noise level 815). The control system can identify the noise level of the pool component through the make and model of pool component (e.g., received via user input or electronic communication with the pool component). Alternatively, the pool system can be in electronic communication with a sound level meter, and can perform a noise procedure to measure the noise level of the pool component when activated.

Performance Status Notification

In some cases, the control system can transmit a flowpath configuration status notification to a user. For example, the control system can notify a user of possible fluid flow conflicts due to concurrently activated pool components. In some cases, the control system can generate a list of recommended flowpath configurations to use, along with benefits of a given configuration (e.g., least amount of noise generated, and the like). In these cases, the user may have the option to select a recommended flowpath configuration. Alternatively, the control system may select a flowpath configuration on behalf of the user. The notification can be sent wirelessly, for example, through a user application to a variety of personal computing devices or mobile phones.

Variable Control of Pool Components

The control system can also vary the operating conditions of pool components based on satisfactory flowpath configurations determined by the control system. For example, a fluid flow pump can be activated at a variable rate of flow according to a selected flowpath configuration. In some cases, the variable operating conditions of the pool component can be considered when determining and selecting a flowpath configuration.

Flowpath Configuration 3

Figure 4:
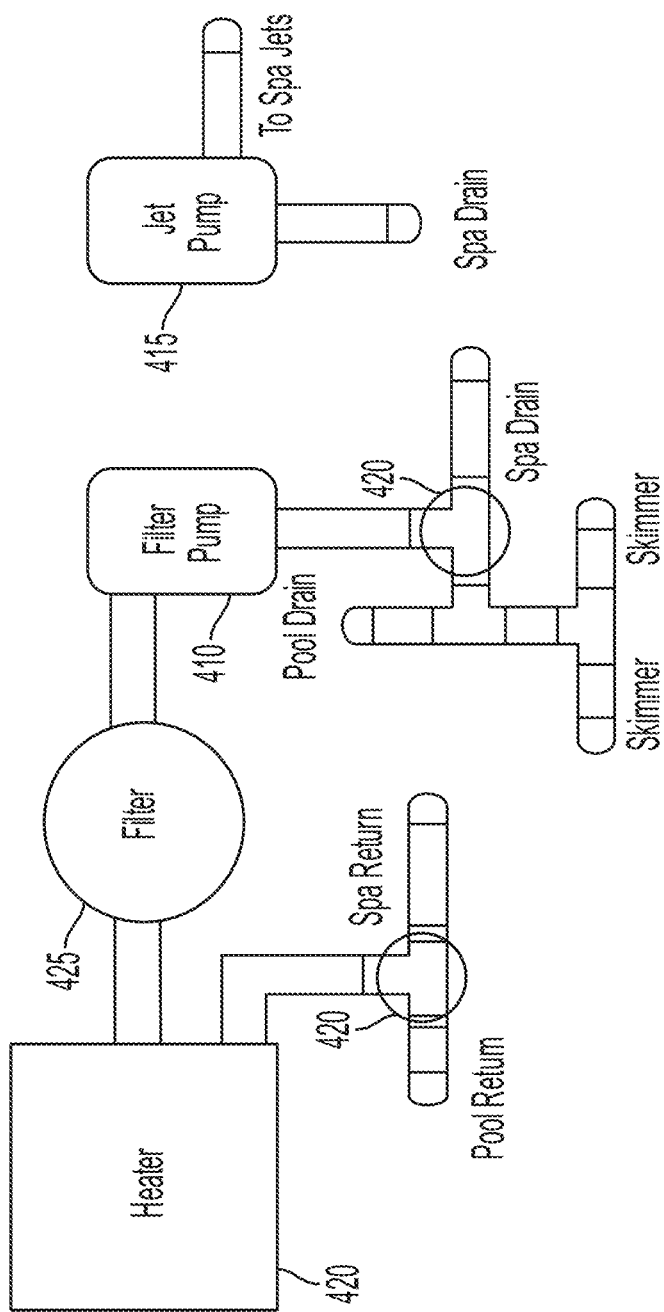

FIG. 4 depicts a pool system configuration according to an embodiment of the invention described herein. In this configuration, a main pump 410 can be fluidically coupled to the heater 420 and the filter 425. Additionally, a spa jet pump 415 can be included apart from the heater 420 and filter 425. The control system can, through a GUI, illustrate "common pool components", such as the spa jet pump 415 and the main pump 410. If a user activates the spa, both pumps 415 and 410 can be activated concurrently. Further, the user can select power output of the spa jets (e.g., at 50%). The control system can consider the spa jet output percentage when determining and selecting a flowpath configuration for activating the spa. Further, the control system can consider other operating parameters, such as noise generation, energy expenditure, carbon footprint, and the like, when determining and selecting a flowpath configuration for the spa.

In some cases, multiple water components can be hidden from user selections. For example, in the above flowpath configuration 3, the UI element can obscure the existence of multiple fluid pumps within the system, such as by grouping them under one "pump" icon. Further, the UI can illustrate power output for the pump icon, for example on the range of 0 to 100%, which can be selected by the user. The system can translate the selected power output to appropriate power output for each individual component grouped under the "pump" icon. For example, at 100%, the control system can activate each fluid pump at 100% power output; at 50%, the control system can activate one or both fluid pumps at 50% power output, and the like. The control system's selection of power output for the pool system can be determined based on factors such as energy expenditure, utility rates, efficiency, and the like.

Flowpath Configuration Modification

The control system can also modify a selected flowpath configuration to satisfy the operating conditions of the activated pool components, while also mitigating the risk of a flow conflict. For example, the control system can switch (e.g., through the use valves and the like) different components in fluidic communication with other activated pool components. An example is provided below.

CONFIGURATION EXAMPLE 4

Figure 5:
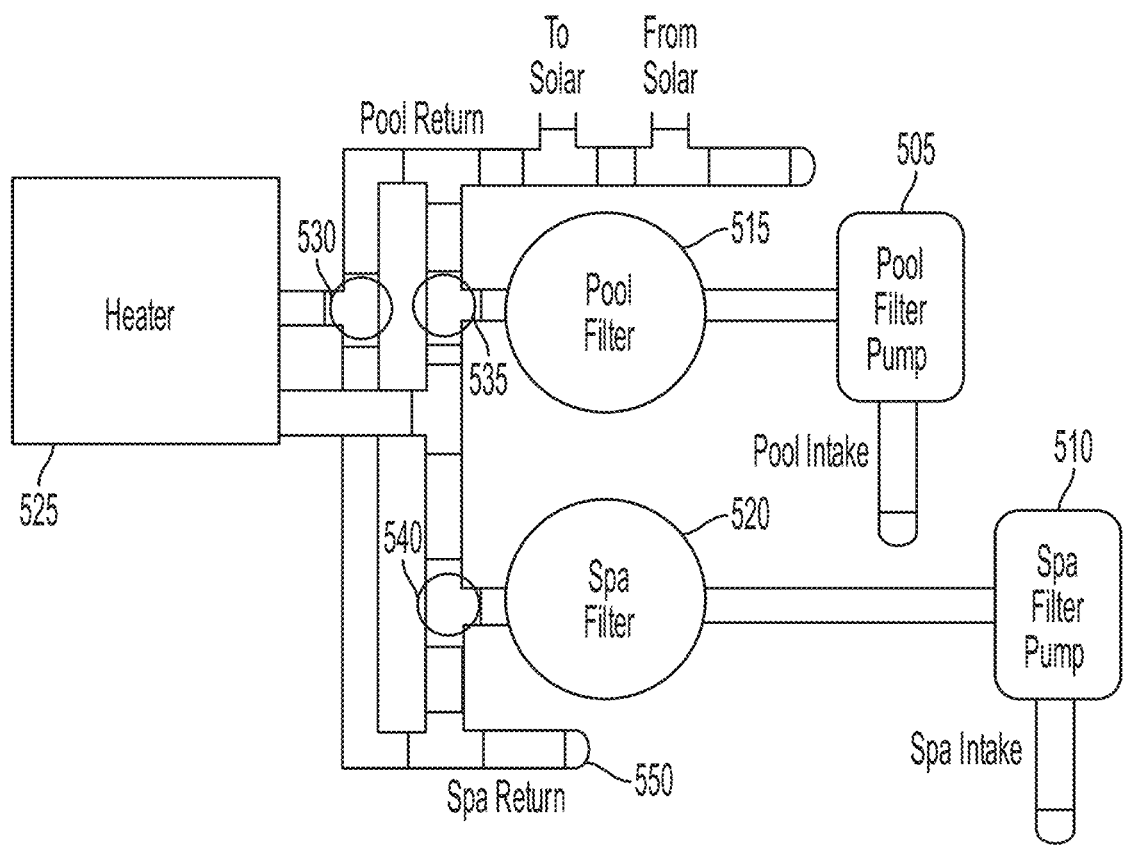

FIG. 5 depicts a pool system configuration according to an embodiment of the invention described herein. In this example, a pool pump 505 and spa pump 510 are each coupled to their own filter (e.g., pool filter 515 and spa filter 520, respectively). However, each pump shares a heater 525. While both pumps can filter water, only one can be connected to the heater 525 at any given time (e.g., due to the heater operating conditions). The control system can identify that both pumps 505 and 510 can operate at variable power output, speed, and the like. In this configuration, the control system can select a flowpath configuration that "shares" the heater 525 between the spa pump 510 and the main pump 505. For example, the heater 525 is coupled to the spa pump 510 for a period of time (e.g., by the control system switching valve 540 to direct water towards the heater and valve 530 to direct water toward the spa return), then the heater 525 is coupled to the main pump 505 for a non-overlapping period of time (e.g., by the control system switching valve 535 to direct water towards the heater and valve 530 to direct water towards the pool return). Thus, the heater 525 can be shared to heat both the spa and the pool, thereby heating both across a period of time while avoiding a flow conflict that would arise if both pumps were coupled simultaneously to the heater 525

Multiple Fluid Repositories

In some cases, the pool system can be fluidically coupled to more than one fluid repository. For example, the pool system can be coupled to a pool basin and a spa basin. The control system can generate filtration procedures for each coupled fluid repository. For example, in some cases input fluid channels into each fluid repository can diverge from a single intake channel, and can be individually coupled or decoupled to fluid flow from the variable speed pump through a channel valve. The control system can be in electronic communication with the channel valve, and can execute activation cycles separately for each of the fluid repositories.

Configurations

The pool system and techniques described herein can be adaptable to the configurations of existing pool maintenance and fluid repository systems. For example, the control system can be configured to communicate with conventional variable speed pumps, flow rate sensors, valves, fluid channels, heater/coolers, thermistors, air thermometers, fluid level sensors, and the like. Importantly, some pool systems can be retrofitted to execute the techniques described herein. For example, many conventional pool systems include a heater, a variable speed pump, a flow switch, and a pool basin. By implementing the techniques described herein, a pool system can effectively identify filtration procedures through a new approach, while utilizing hardware already installed for the pool system. This can significantly decrease costs for pool owners, for example, by eliminating the needs for expensive installation costs and reducing renovation costs, as well as provide the owner with cost-effective techniques for regulating the filtration procedure of a pool, spa, hot tub, and the like.

Further, as shown in the figures and accompanying description, the system and techniques described herein can be adapted to a variety of pool, spa, or other fluid repository systems. While the figures depict specific examples of configurations, one skilled in the art would understand that the pool system and associated techniques can be integrated into a multitude of fluid repository systems.

Inclusion of Non-Fluid-Flow Components

Although described primarily in the context of fluid-flow components such as pumps, embodiments of the system can also control non-fluid-flow components (e.g., in connection with fluid-flow components). For example, consider a system including a swimming pool, a spa with a spillover into the swimming pool, and a swimming-pool cover. If the user were to actuate the swimming-pool cover while the spillover feature is actuated, water could quickly accumulate on the swimming pool cover and cause damage. Accordingly, such a configuration can be deemed unsatisfactory.

Embodiments of the system can also select unsatisfactory flowpath configurations in some cases to prevent equipment damage. In the above pool cover example, the control system can identify the pool cover actuation and the concurrent spillover feature activation. The control system may select a flowpath configuration (e.g., controlling valves) that drains the spa as quickly as possible in order to mitigate any damage experience by the pool cover. However, under normal operation, the selected flowpath may be considered unsatisfactory in that the configuration may eventually cause a flow conflict.

Modulation of Pump Speed to Compensate for Filter Obstructions

Embodiments of the invention can detect that the fluid filter 110 is becoming obstructed (e.g., by leaves or other debris) and increase pump speed to compensate for the obstructions. The degree of increase can be a function of the calculated degree of obstruction. In some embodiments, the degree of increase can be capped and/or increases may only be triggered up to a defined degree of obstruction in order to avoid damage to components if the filter is significantly or completely obstructed. The status of the filter can be assessed using a flow sensor as described herein and/or using the paddle-sensor method described in U.S. Provisional Patent Application Ser. No. 63/011,470, filed Apr. 17, 2020.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A computer-implemented method for controlling a swimming pool or spa system, the computer-implemented method comprising:
creating a data structure representing a plurality of swimming pool or spa system components and fluidic connections between subsets of the plurality of swimming pool or spa system components, wherein the data structure is created using a graphical interface in which a user can define the fluidic connections;
receiving a request to control the swimming pool or spa system;
calculating fluidic flows through the plurality of swimming pool or spa system components based on one or more potential configurations of the plurality of swimming pool or spa system components capable of fulfilling the request based on the data structure;
detecting whether one or more unsatisfactory potential configurations of the one or more potential configurations result in unsatisfactory conditions in which components of the swimming pool or spa system could be damaged or water or energy could be wasted from the calculated fluidic flows through the plurality of swimming pool or spa system components;
detecting one or more satisfactory potential configurations of the one or more potential configurations that result in satisfactory fluidic flow and are not the one or more unsatisfactory potential configurations;
autonomously selecting one of the one or more satisfactory potential configurations; and
controlling one or more of the plurality of swimming pool or spa system components to implement the selected satisfactory configuration.

2. The computer-implemented method of claim 1, wherein the selecting step identifies the most optimal of the one or more satisfactory configurations for the fluidic flow to the one or more of the plurality of swimming pool or spa system components based on one or more criteria.

3. The computer-implemented method of claim 2, wherein the one or more criteria include one or more selected from the group consisting of: cost, noise, speed, and carbon footprint.

4. The computer-implemented method of claim 1, wherein the unsatisfactory conditions include one or more selected from the group consisting of: underflow, overflow, no-flow, misdirection, and unsafe.

5. The computer-implemented method of claim 1, wherein one or more of the unsatisfactory conditions is defined on a component-specific basis.

6. The computer-implemented method of claim 1, further comprising:
restricting a user's ability to select the one or more potential configurations resulting in the unsatisfactory conditions.

7. The computer-implemented method of claim 6, wherein the restricting step comprises disabling one or more graphical user interface widgets associated with the one or more potential configurations.

8. The computer-implemented method of claim 6, wherein the restricting step comprises presenting an alternative to the user request that would bring about the one or more potential configurations resulting in the unsatisfactory conditions.

9. The computer-implemented method of claim 1, wherein the one or more of the plurality of swimming pool or spa system components comprises an actuator-based pool cleaner.

10. The computer-implemented method of claim 1, wherein the one or more of the plurality of swimming pool or spa system components comprises a booster-pump-based pool cleaner.

11. The computer-implemented method of claim 1, wherein the one or more potential configurations include fluid flow through a spa basin.

12. The computer-implemented method of claim 1, wherein the plurality of swimming pool or spa system components further comprises a plurality of fluid flow pumps.

13. The computer-implemented method of claim 12, wherein the unsatisfactory conditions can be selected from the group consisting of: underflow, overflow, and safety conditions of the plurality of fluid flow pumps.

14. The computer-implemented method of claim 1, wherein the unsatisfactory conditions can be selected from the group consisting of: underflow, overflow, and flow rate restrictions of the fluidic connections.

15. The computer-implemented method of claim 14, further comprising:
adjusting power output of at least one of the plurality of swimming pool or spa system components based on the flow rate restrictions.

16. The computer-implemented method of claim 1, wherein the plurality of swimming pool or spa system components comprises at least a pool basin and a spa basin.

17. The computer-implemented method of claim 16, wherein the unsatisfactory conditions can be selected from the group consisting of: underflow, overflow, and fluid spillover restrictions.

18. The computer-implemented method of claim 1, wherein the plurality of swimming pool or spa system components comprises at least one or more fluid valves.

19. The computer-implemented method of claim 1, wherein the plurality of swimming pool or spa system components comprises at least one or more pool heaters, pool coolers, or a combination thereof.

20. The computer-implemented method of claim 1, wherein the plurality of swimming pool or spa system components comprises at least one or more water features.

* * * * *